United States Patent Office 3,429,955
Patented Feb. 25, 1969

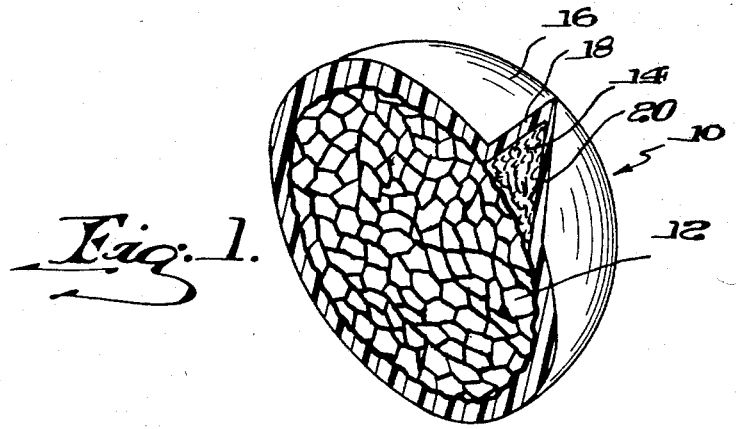
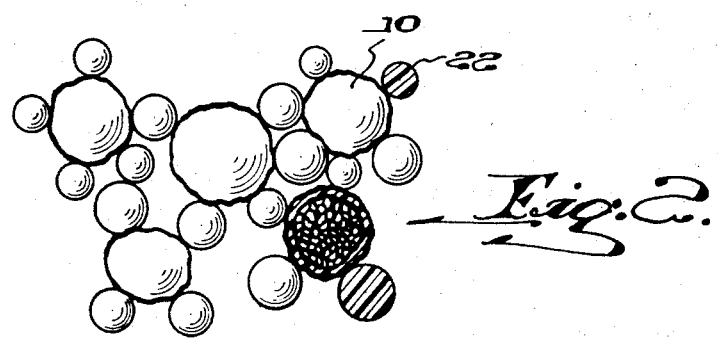
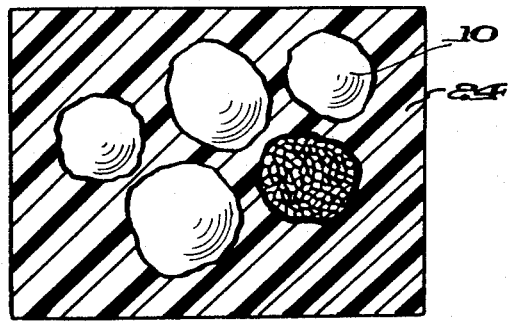

3,429,955
METHOD OF MAKING A SHAPED ARTICLE FROM COATED MULTICELLULAR GLASS NODULES
Howard E. Johnson, Trafford, and Dominic D'Eustachio, Pittsburgh, Pa., assignors to Pittsburgh Corning Corporation, Port Allegany, Pa., a corporation of Pennsylvania
Filed Sept. 23, 1965, Ser. No. 489,659
U.S. Cl. 264—45           4 Claims
Int. Cl. B29d 27/04

ABSTRACT OF THE DISCLOSURE

A method of forming a shaped article from multicellular glass nodules and an expanded thermoplastic resin. The cellular glass nodules are first coated with either a monomer of a thermoplastic resin or a relatively thin layer of the thermoplastic resin. The coated nodules are thereafter mixed with pellets of unexpanded or partially expanded thermoplastic resin. The granules have an affinity for the coated cellular glass nodules and adhere to the surface of the nodules so that the thermoplastic resin pellets and the nodules are uniformly distributed in the admixture. A mold cavity is filled with the admixture and the mold is heated to a temperature above the softening point of the thermoplastic resin and the pellets of thermoplastic resin expand or cellulate and encapsulate the cellular glass nodules to form a shaped article having a continuous matrix of expanded thermoplastic resin encapsulating the cellular glass nodules.

---

This invention relates to a method of forming a shaped article from a composite of multicellular glass nodules and an expanded thermoplastic resin and more particularly to a method of coating the multicellular glass nodules with a thermoplastic resin and forming a shaped article comprising coated multicellular glass nodules in a matrix of expanded thermoplastic resin.

The making of shaped low density cellular plastic articles from expanded granules or beads of thermoplastic material is well known. The granules generally contain either a liquid that boils below the softening point of the thermoplastic material or a combination of chemicals that evolve gas when the granules are heated to their softening point. The granules are placed in a mold cavity which defines the shape of the article, and the granules within the mold are thereafter heated by a suitable heating media to a temperature above their softening point. The granules then expand and completely fill the mold cavity and fuse together to form the shaped article. Shaped articles formed from low density thermoplastic materials have found wide use in many areas because of their low thermal conductivity, low density and relative simplicity in forming shaped articles. Although the low density thermoplastic materials have found wide use in many areas, shaped articles formed therefrom are not dimensionally stable, are relatively weak and relatively expensive. Attempts have been made in the past to form shaped articles from expandable thermoplastic materials and other solid constituents to reduce the cost of the shaped article and to impart an increased compressive strength thereto. Problems in the molding process have been encountered, however, due to the separation of the granules of unexpanded thermoplastic resin and the other solid constituents in the shape article.

There has been developed recently an improved process for making multicellular glass nodules of different sizes that have a low thermal conductivity and a substantial compressive strength. The cost of the cellular glass nodules compared on a volumetric basis with expanded thermoplastic materials indicates the cellular glass nodules reduce substantially the cost of shaped articles formed from an admixture of cellular glass nodules and an expanded thermoplastic resin. The shaped articles in addition have the compressive strength and dimensional stability more nearly equal to that of the cellular glass nodules to further improve the physical properties of the shaped articles.

The difference in density and size between the unexpanded or partially expanded granules and the cellular glass nodules in the composite presents substantial problems in the molding of shaped articles therefrom. The beads or granules of the unexpanded thermoplastic material in the admixture of granules and cellular glass nodules tend to migrate or settle downwardly in the lower portion of the mold. When the admixture in the mold is thereafter subjected to elevated temperatures the thermoplastic resin does not expand uniformly throughout the entire mold. Portions of the article shaped therefrom contains only the expanded thermoplastic resin and other portions contain only the cellular glass nodules. There is a nonuniform distribution of the expanded thermoplastic resin in portions of the shaped article, and the cellular glass nodules are not adequately bonded to each other by the expanded thermoplastic resin. There is a need, therefore, for a relatively simple inexpensive process for making a composite from expanded thermoplastic material that encapsulates all of the cellular glass nodules and forms shaped articles having the desired properties of the expanded thermoplastic material and in addition increased compressive strength.

Briefly, the herein described invention is directed to a process for making shaped articles from an unexpanded thermoplastic resin that uniformly encapsulates the substantially spherical multicellular glass nodules. The multicellular glass nodules are first coated with either a monomer of the thermoplastic resin or a relatively thin layer of the thermoplastic resin. The coated cellular glass nodules are thereafter admixed with granules of the unexpanded or partially expanded thermoplastic resin. Surprisingly, the granules of unexpanded or partially expanded thermoplastic resins have an affinity for the coated cellular glass nodules, so that when the coated cellular glass nodules are admixed with the thermoplastic resin, the unexpanded or partially expanded resin granules adhere to the coated surface of the cellular glass nodules and are uniformly distributed throughout the admixture with the cellular glass nodules. When a mold cavity that defines the shape of the article is filled with an admixture of coated cellular glass nodules and the unexpanded thermoplastic resin granules, there is a uniform distribution of the unexpanded thermoplastic resin granules and cellular glass nodules throughout the mold cavity. When the mold is heated to a temperature above the softening point of the thermoplastic resin the thermoplastic resin granules expand and uniformly encapsulate the cellular glass nodules to form a shaped article that has a continuous matrix of expanded thermoplastic resin encapsulating the cellular glass nodules.

Alternatively the cellular glass nodules may be coated with a thermoplastic resin containing either a liquid which boils below the softening point of the thermoplastic material or a combination of chemicals that evolve a gas when the thermoplastic material is heated above its softening point. A mold cavity filled with the cellular glass nodules coated with the expandable thermoplastic resin, when heated to a temperature above the softening point of the thermoplastic resin, expands the thermoplastic resin coating on the cellular glass nodules to fill the interstices between the substantially spherical cellular glass nodules and form a shaped article with a matrix of expanded thermoplastic resin encapsulating the substantially spherical cellular glass nodules.

Accordingly, the principal object of this invention is to provide a method of making shaped articles from multicellular glass nodules and an expandable thermoplastic resin.

Another object of this invention is to provide a process for making shaped articles from cellular glass nodules coated with a thermoplastic resin.

A further object of this invention is to provide a method for making shaped articles from an admixture of multicellular glass nodules coated with a thermoplastic resin and granules of an unexpanded or partially expanded thermoplastic resin.

A still further object of this invention is to provide a method for reducing the cost of making a shaped article from thermoplastic resin.

Another object is to increase the dimensional stability of lightweight, low thermal conductivity shaped articles made from thermoplastic resins.

These and other objects and advantages of this invention will be more completely disclosed and described in the following specification, the accompanying drawings and the appended claims.

In the drawings:

FIGURE 1 is a view partially in section of a cellular glass nodule coated with a thermoplastic resin.

FIGURE 2 is a semidiagrammatic illustration of an admixture of cellular glass nodules coated with a thermoplastic resin and unexpanded thermoplastic resin granules.

FIGURE 3 is another diagrammatic representation of a section of a shaped article having a continuous matrix of expanded thermoplastic resin uniformly encapsulating cellular glass nodules.

Cellular glass nodules have many advantageous features when compared with other types of thermal insulation. Cellular glass is an inorganic, closed cell, lightweight material that has a high resistance to fire, moisture, vermin and other objectionable agencies. Cellular glass has other desirable properties that makes it especially suitable for use as an insulating material. Recently a process has been developed for making multicellular glass in the form of substantially spherical nodules. The process for making substantially spherical nodules of multicellular glass is described in copending application Ser. No. 297,023 entitled "Cellular Glass Nodules."

Cellular glass nodules made according to the process described in copending application Ser. No. 297,023 may be made in various sizes and at various densities depending upon the end use for which the cellular glass nodules are intended. For example, cellular glass nodules having a diameter of between ½" and ¾" and a density of about 8 pounds per cubic foot may be made according to the process described in copending application Ser. No. 297,023. Nodules having a density of between about 8 pounds per cubic foot and 30 pounds per cubic foot and sizes ranging from less than $\frac{1}{16}$" in diameter to more than 1" in diameter may also be made according to this process. There is, therefore, now available an inorganic low density material having the desired insulation properties and compressive strength. The cellular glass may be economically produced at a cost, from a volumetric standpoint, much below that of expanded thermoplastic resins, and shaped articles formed from composites of an expanded thermoplastic resin and the cellular glass nodules are less expensive than shaped articles formed from the thermoplastic resin alone.

Expandable polymers suitable for use in making cellular articles in accordance with this invention include a variety of homopolymers and copolymers derived from vinyl monomers including styrene, vinyl chloride, divinyl benzene, alpha-methyl styrene, nuclear dimethyl styrenes, vinyl naphthalene, etc. Particular polymers that are useful are polystyrene and its copolymers with such monomers as butadiene, alpha-methyl styrene, divinyl benzene, iso- butylene and acrylonitrile. These expandable materials in granular form have incorporated therein as a propellant a volatile organic liquid in an amount of from 3 to 35 parts by weight of the polymer such as saturated aliphatic hydrocarbons containing from 4 to 7 carbon atoms in the molecule, for example, butane, pentane, hexane, heptane, cyclohexane or halogenated derivatives of methane and ethane which boil below 95° C. Other suitable propellants include water or a combination of chemicals which will evolve a gas such as carbon dioxide, water vapor or nitrogen when heated to a temperature at or below the softening point of the polymer, for example, sodium bicarbonate and citric acid.

Referring to the drawings and particularly to FIGURE 1, the cellular glass nodule generally indicated by the numeral 10 has a plurality of separate individual cells 12 and an outer skin 14. The cells 12 are closed cells and the glassy material envelopes the individual cells and forms the continuous matrix for the cellular nodule 10. The nodules, as previously discussed, may be made in various sizes. The invention may be practiced with nodules of any reasonable size, but for shaped articles having relatively thin walls, nodules having a diameter between two-thirds and one-tenth the wall thickness of the finished article are preferred. The external surface of the nodule 10 is a continuous nonporous surface of glass material encapsulating the individual cells therewithin. The surface of the cellular glass nodule 10 is a relatively regular glassy surface that provides a substantially spherically shaped nodule, as is illustrated by the quadrant of the nodule 10 where the coating 16 is removed therefrom. The quadrant is designated by the lines 18 and 20 and the surface or skin of the nodule by the numeral 14. In FIGURE 1 the thickness of the coating is exaggerated for illustrative purposes. Coatings having a thickness of between 0.0005" and 0.010" have been found suitable.

The cellular glass nodule 10 is coated with a thermoplastic resin, as for example, a polystyrene resin. The polystyrene is dissolved in a suitable solvent, as for example, toluene, benzene, styrene monomer or an equivalent solvent. The amount of the solvent required can vary to regulate the viscosity of the solution. For example, a solution having a viscosity of less than 1 centipoise at 20° C. has been found suitable. Sufficient solvent should be admixed with the thermoplastic resin to permit the nodule to be easily wetted or coated therewith.

The nodules may be coated with the thermoplastic resin solution by spraying or the like so that the nodules preferably have a coating with a thickness of between 0.0005" to 0.010" or to an extent where the coated nodules have between about 4 to 8 percent by weight of polystyrene coating.

The cellular glass nodules 10 coated with the polystyrene resin are admixed with granules of an unexpanded or partially expanded thermoplastic resin such as granules of unexpanded polystyrene which are generally designated by the numeral 22 in FIGURE 2. The coated cellular glass nodules 10 and the unexpanded polystyrene granules are thoroughly admixed in a suitable mixing device. The polystyrene granules 22 have surprisingly been found to have an affinity for the coated cellular glass nodules 10 so that the polystyrene granules are substantially uniformly distributed throughout the admxiture and uniformly distributed about each of the cellular glass nodules, as is illustrated in FIGURE 2. It should be understood, although not illustrated in FIGURE 2, that the granules of thermoplastic resin will adhere to all quadrants of the spherical surface and not be limited to a single plane, as is illustrated. FIGURE 2 is intended to illustrate in a single plane how the thermoplastic resin granules 22 are uniformly distributed about the coated cellular glass nodules.

The admixture of unexpanded polystyrene granules 22 and the coated cellular nodules 10 are placed in a mold cavity and heat is supplied to the mold cavity by any suitable means such as external heat, steam heat or high frequency dielectric heating. The admixture is heated to a temperature of about 200–205° F. At this temperature the polystyrene resin granules soften and expand uniformly about each of the cellular glass nodules and from a matrix of expanded thermoplastic resin indicated by the numeral 24 in FIGURE 3. The expanded thermoplastic resin surrounds the cellular glass nodules indicated by the numeral 10. Although the cellular glass nodules 10 are illustrated as being spaced from each other a substantial distance, it should be understood that by regulating the quantity of polystyrene resin granules and the coating of polystyrene resin on the surface of the nodule the relative spacing between the nodules may be readily controlled so that the nodules may be positioned in substantially contiguous relation with each other to provide desired compressive strength of the multicellular glass and yet retain the flexibility of the polystyrene resin. The thermoplastic resin coating on the nodules blends with the thermoplastic resin in the granules during the expansion of the granules in the mold.

In lieu of the thermoplastic resin solution applied as a coating on the nodules, a styrene monomer in liquid form may be applied to the surface of the nodule 10. The styrene monomer may include a blowing agent such as sodium bicarbonate and citric acid. Where desired, the styrene monomer may be partially polymerized by adding limited quantity of polystyrene crystals and admixing the polystyrene crystals with the styrene monomer until partial polymerization takes place. The dry powders of sodium bicarbonate and citric acid may be added to the partially polymerized mass and the nodules coated therewith. Any suitable mixing device may be employed to coat the nodules with the partially polymerized mass. During admixing substantially complete polymerization of the partially polymerized styrene in the coating may be accomplished. Care should be exercised, however, in maintaining the temperature below the reaction temperature of the citric acid sodium bicarbonate blowing agent. The nodules containing the coating of the polymerized polystyrene and the blowing agent are then admixed with the granules of polystyrene as previously described. Where it is desired, a coating of sufficient thickness may be applied to the nodules so that additional unexpanded or partially expanded polystyrene granules are not necessary and shaped articles can be formed in a mold from the coated nodules above.

The following specific examples illustrate the above described invention. It should be understood, however, the specific materials and their proportions are illustrative and are not intended to limit the scope of the invention.

Example I

Partially expanded polystyrene granules, sold under the trad name of Dylite F40–L by Koppers Company, were dissolved in benzine and a solution with a viscosity of less than 1 centipoise was prepared. Cellular glass nodules having a size capable of passing through a 3½ mesh Tyler Standard screen and being retained on a 14 mesh Tyler Standard screen were coated with the polystyrene solution. The coated nodules contained between 4 and 8 percent by weight of the polystyrene and were air dried. Partially expanded polystyrene granules sold under the trade name Dylite F40–L were admixed with the coated cellular glass nodules in approximately equal volumetric ratios. The polystyrene granules had an affinity for the coated surface of the nodules and were uniformly distributed throughout the admixture. A mold cavity was filled with the admixture and heated to a temperature of about 200° F. where the polystyrene granules expanded and encapsulated the cellular glass nodules and formed a shaped article having a continuous matrix of expanded polystyrene resin encapsulating the cellular glass nodules. The shaped article had a thickness of about 1", a density of about 8 pounds per cubic foot and a thermal conductivity of about 0.375 B.t.u./hr./sq. ft./°F./in. at 75° F. The compressive strength of the shaped article was about 75 pounds per square inch.

Example II

Uncoated cellular glass nodules having substantially the same size as in Example I were admixed with granules of partially expanded polystyrene resin sold under the trade name of Dylite E40–L. The components were thoroughly admixed and a mold cavity was filled with the admixture. The admixture in the mold cavity was heated to about 200° F. until the polystyrene resin expanded. The shaped article had a nonuniform distribution of the expanded polystyrene therein. The lower portion of the shaped article appeared to consist substantially of expanded polystyrene resin, and the upper portion as positioned in the mold consisted essentially of the multicellular glass nodules. There was an insufficient amount of the expanded polystyrene resin surrounding the cellular glass nodules to bond the nodules in the shaped article.

The above examples clearly illustrate the necessity of coating the multicellular glass nodules with a resin to obtain a shaped article therefrom. The relative volumetric proportions of the cellular glass nodules and unexpanded polystyrene beads may vary depending upon the type of shaped article desired. The following volumetric ratios have been found suitable.

| | Percent by volume |
|---|---|
| Multicellular glass nodules | 60–5 |
| Polystyrene granules | 40–90 |

The bulk density of the shaped article may range between 6 and 20 pounds per cubic foot depending on the relative volumetric proportions of cellular glass nodules and polystyrene resin.

Where desired a liner of either an impervious plastic material or a metal foil may be bonded to all or some of the surfaces of the shaped article to provide other desirable properties.

According to the provisions of the patent statues, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. A method of producing shaped articles from discrete multicellular glass nodules comprising the steps of, providing discrete multicellular glass nodules having a spectrum of sizes ranging between ⅔ and ¹⁄₁₀ the wall thickness of the shaped article, dissolving polystyrene particles in a solvent to form a viscous liquid coating material, coating the discrete multicellular glass nodules with the liquid coating material, removing the solvent from the coating material to form a polystyrene film coating on the multicellular glass nodules, obtaining pellets of polystyrene having a blowing agent adapted at an elevated temperature to cellulate and expand the polystyrene pellets, admixing the polystyrene pellets with said polystyrene coated multicellular glass nodules to form an admixture of uniformly distributed polystyrene pellets and multicellular glass nodules, said polystyrene pellets adhering to the coated surface of said multicellular glass nodules, in which said admixture contains between 50 volume percent expanded polystyrene and between about 50 volume percent cellular glass nodules, filling a mold cavity with said admixture, and subjecting said admixture of polystyrene pellets and polystyrene coated multicellular glass nodules in said mold cavity to an elevated temperature to soften said polystrene pellets and react said chemically decomposable blowing agent in said polystyrene pellets to cellulate said polystyrene and bond said adjacent multicellular glass nodules to each other and substantially fill the interstices therebetween with polystyrene to form a unitary shaped article.

2. A method of producing shaped articles from discrete multicellular glass nodules as set forth in claim 1 in which said admixture contains between about 50 volume percent expanded polystyrene and between about 50 volume percent cellular glass nodules.

3. A method of produing shaped articles from discreate multicellular glass nodules as set forth in claim 1 in which said shaped article has a bulk density of about 8 pounds per cubic foot and thermal conductivity of about .375 B.t.u./hr./sq. ft./°F./in. at 75° F.

4. A method of producing shaped articles from discrete multicellular glass nodules as set forth in claim 1 in which said coating of polystyrene on said cellular glass nodules has a thickness of between about .0005 inch and .010 inch.

References Cited

UNITED STATES PATENTS 2,806,509   9/1959   Bozzacco et al. _____ 260—2.5
3,305,498   2/1967   Herman et al. ____ 260—2.5 X

OTHER REFERENCES

Resnick, Israel, Modern Plastic, Performance of Glass Spheres/Epoxy Syntactic Foam, TP–986–A1m6, vol. 43, Nov. 1, rec. Sept. 22, 1965. Page 144 relied on.

JULIUS FROME, *Primary Examiner.*

L. GARRETT, *Assistant Examiner.*

U.S. Cl. X.R.

264—51; 117—100